US008576686B2

(12) United States Patent
Musto (10) Patent No.: US 8,576,686 B2
(45) Date of Patent: Nov. 5, 2013

(54) APPARATUS FOR MULTILEVEL OPTICAL RECORDING

(75) Inventor: James J. Musto, Pittston, PA (US)

(73) Assignee: Cinram Group, Inc., Phoenix, AZ (US)

(*) Notice: Subject to any disclaimer, the term of this patent is extended or adjusted under 35 U.S.C. 154(b) by 2059 days.

(21) Appl. No.: 11/042,893

(22) Filed: Jan. 25, 2005

(65) Prior Publication Data

US 2006/0165419 A1    Jul. 27, 2006

(51) Int. Cl.
G11B 7/00 (2006.01)
(52) U.S. Cl.
USPC .......................................................... 369/116
(58) Field of Classification Search
None
See application file for complete search history.

(56) References Cited

U.S. PATENT DOCUMENTS

| | | | |
|---|---|---|---|
| 4,425,637 A | 1/1984 | Tanaka et al. | |
| 5,297,129 A | 3/1994 | Wilkinson et al. | |
| 5,400,313 A * | 3/1995 | Belser et al. | 369/59.11 |
| 5,608,711 A | 3/1997 | Browne et al. | |
| 5,608,712 A | 3/1997 | Rilum et al. | |
| 5,666,460 A | 9/1997 | Ohta et al. | |
| 5,822,287 A | 10/1998 | Kubota et al. | |
| 6,094,407 A | 7/2000 | Kim | |
| 6,414,935 B1 | 7/2002 | Masuhara et al. | |
| 6,611,492 B2 | 8/2003 | Akimori et al. | |
| 6,683,832 B2 | 1/2004 | Endoh | |
| 6,704,096 B1 | 3/2004 | Takeda et al. | |
| 6,785,221 B2 | 8/2004 | Wilkinson et al. | |
| 6,819,472 B2 | 11/2004 | Enokihara et al. | |
| 7,325,287 B2 | 2/2008 | Sweeney | |
| 7,419,045 B2 | 9/2008 | Kelsch | |
| 7,535,806 B2 | 5/2009 | Fumanti | |
| 7,564,771 B2 | 7/2009 | Sweeney | |
| 2001/0038592 A1* | 11/2001 | Kobayashi | 369/59.23 |
| 2006/0023598 A1 | 2/2006 | Babinski et al. | |
| 2006/0101634 A1 | 5/2006 | Sweeney | |
| 2006/0104190 A1 | 5/2006 | Babinski | |
| 2006/0181706 A1 | 8/2006 | Sweeney | |
| 2006/0222808 A1 | 10/2006 | Pickutoski et al. | |
| 2006/0270080 A1 | 11/2006 | Rinaldi | |
| 2006/0274617 A1 | 12/2006 | Musto et al. | |
| 2007/0008861 A1 | 1/2007 | Fumanti | |
| 2007/0014224 A1 | 1/2007 | Sweeney | |
| 2007/0029167 A1 | 2/2007 | Kelsch | |
| 2007/0090006 A1 | 4/2007 | Kelsch | |
| 2007/0098947 A1 | 5/2007 | Mueller | |

FOREIGN PATENT DOCUMENTS

WO    WO94/23343    10/1994

OTHER PUBLICATIONS

"A Guide to Stamper Making".
"Cutting LBRs down to size", www.oto-online.com/nov00/cutting.html.

(Continued)

Primary Examiner — Christopher R Lamb
(74) Attorney, Agent, or Firm — Cooper & Dunham LLP (57) ABSTRACT

An improvement to an optical recording apparatus is provided for adapting the apparatus for an optical recording format using multiple modulation levels. The improvement includes an electro-optic modulator (EOM) added between a light source and a first modulator, to regulate a power of the light beam supplied to the first modulator. A modulation interface is adapted to output a power control signal to the EOM, and the EOM regulates the power of the light beam supplied to the first modulator to a power level corresponding to the power control signal. The apparatus is further adapted to supply a formatted data signal directly from a formatter to the first modulator, without going through the modulation interface.

19 Claims, 4 Drawing Sheets

(56) References Cited

OTHER PUBLICATIONS

U.S. Appl. No. 11/715,249, filed Mar. 6, 2007.
U.S. Appl. No. 11/726,968, filed Mar. 22, 2007.
U.S. Appl. No. 11/259,487, filed Oct. 26, 2005.
U.S. Appl. No. 11/284,687, filed Nov. 22, 2005.
U.S. Appl. No. 11/705,682, filed Feb. 13, 2007.
U.S. Appl. No. 11/705,682, filed Feb. 13, 2007 of Michael Parette.
U.S. Appl. No. 11/715,249, filed Mar. 6, 2007 of William R. Mueller et al.
U.S. Appl. No. 11/726,968, filed Mar. 22, 2007 of Lewis Gensel et al.
U.S. Appl. No. 11/936,625, filed Nov. 7, 2007 of Petrus Hubertus van Hoof et al.
U.S. Appl. No. 11/938,572, filed Nov. 12, 2007 of Dominick A. Dallaverde et al.
U.S. Appl. No. 12/126,667, filed May 23, 2008 of Ed Pickutoski.

* cited by examiner

FIG. 1

Prior Art

APPARATUS FOR MULTILEVEL OPTICAL RECORDING

TECHNICAL FIELD

This application relates to optical recording. In particular, the application relates to improvements to an optical recording apparatus which enable the apparatus to record in optical recording formats using multiple modulation levels.

DESCRIPTION OF RELATED ART

Use of CDs (compact discs) and DVDs (digital versatile discs or digital video discs) as optical storage media ("optical discs") for storing and transporting content (such as audio, video, graphics, computer software, etc.) in an optically readable manner has been popular for a number of years.

Optical discs are conventionally available in several formats, including read-only formats such as CD-DA (digital audio compact disc), CD-ROM (CD-read-only memory), DVD-ROM, etc., and recordable formats in the form of (i) write-once read-many times formats such as CD-R (CD-recordable), and DVD-R (DVD-recordable), etc., or (ii) rewritable formats such as CD-RW (CD-rewriteable), DVD-RAM (DVD-Random Access Media), DVD-RW or DVD+RW (DVD-rewriteable), PD (Phase change disk) and other phase change optical discs. Optical disc players for these optical discs use a red laser. Optical discs using a blue laser have also been introduced, such as HD DVD and BD.

In conventional read-only type optical discs (for example, CD-ROM, DVD-ROM, etc.), data is generally stored as a series of "pits" embossed in a plane of "lands". Microscopic pits formed in a surface of a plastic medium are arranged in tracks, conventionally spaced radially from the center hub in a spiral track originating at the medium center hub and ending toward the medium's outer rim. The light reflected from a read-only medium's surface by an optical disc player or reader varies according to the presence or absence of pits along the information track. A photodetector and other electronics inside the optical disc player translate the signal from the transition points between these pits and lands caused by this variation into the 0s and 1s of the digital code representing the stored information.

Read-only type optical discs are produced by an injection molding process. Initially, data representing the content to be recorded is used to control a laser beam recorder to form pits in a photoresist layer (or a dye polymer layer) on an optical grade glass disc known as a glass master. The glass master is used to form a (typically, metal) stamper. The stamper is used on one side of an injection molding cavity to form a substrate of a transparent polymer, and the information bearing surface of the substrate is then covered with a reflective film or the like. In the case of a CD, a plastic coating is applied over the film, and then art (for example, a picture, a design, text, etc.) is typically printed on the upper surface of the disc, to form an end product. In the case of DVDs, two half-thickness substrates are bonded, with information layer(s) in the middle thereof, and the art is put on one of the outside surfaces.

Recordable-type optical discs typically include a spiral wobble groove in the substrate. The groove defines recording channels on the disc for recording data, provides information for tracking of the disc while writing or reading data, and has its wobble frequency modulated to contain addressing and other information used for the write and read processes. In addition, recordable-type optical discs generally include a recording layer. Information is recorded in the recordable-type optical medium by directing a laser light beam modulated by signals to selectively change optical characteristics (reflectivity or extinction coefficient) of the recording layer. The recording layer in a write-once read-many times optical disc typically includes a photosensitive organic dye which is heated during recording to irreversibly form a pattern of marks or pits into the recording layer. Rewritable optical media typically include a phase-change type recording layer having a polycrystalline structure. During recording of the rewritable optical medium, the laser selectively heats tiny areas of the recording track to change the phase of each heated area from more crystalline into less crystalline (also known as "amorphous") phase, in order to create marks that can be called "pits". During erase, the laser (in a process called "annealing") changes the amorphous areas back into more crystalline areas.

The term "pit" is used broadly below to cover, for example, a pit in a read-only type optical disc, and a pit or mark in a recordable or rewritable optical disc.

Conventional optical recording formats typically use only a single pit depth or reflectivity level. In addition, the transition points between these pits and lands in a conventional format (for example, DVD) must be in a range between 3 T and 14 T (with T being a fixed period of time; for DVD T is approximately 231 nanoseconds). Therefore, the laser beam in a conventional optical recording apparatus can be modulated at a constant modulation level (that is, between an on-intensity level and an off-intensity level), for conventional optical recording formats. However, such an apparatus is not suitable for variable-level modulation (that is, different modulation levels in the same modulation stream) which may be used for the new generation of optical recording formats (for example, HD DVD and BD), wherein transition points between these pits and lands can be as low as 2 T, and wherein the rotation rate can be substantially higher.

An electro-optic modulator (EOM) is an optical device in which a signal-controlled element is used to modulate a beam of light. The modulation may be imposed on the phase, frequency, amplitude, and/or direction of the modulated beam. Some EOMs are discussed in U.S. Pat. No. 6,819,472 to Enokihara et al.

EOMs have many uses in optical recording. For example, an EOM may be used in optical recording to reduce noise in the light beam. See, for example, U.S. Pat. No. 6,611,492 to Akimori et al. and U.S. Pat. No. 6,683,832 to Endoh. In addition, an EOM may be used in optical recording for phase modulation. See, for example, U.S. Pat. No. 5,822,287 to Kubota et al. An EOM can also be used in place of an acoustic-optical modulator for modulating an intensity of the light beam. See, for example, U.S. Pat. No. 4,425,637 to Tanaka et al. and U.S. Pat. No. 6,785,221 to Wilkinson, et al. No teaching or disclosure is found in the above-identified patents to use an EOM for power control in order to adapt an optical recording apparatus for an optical recording format using multiple modulation levels.

SUMMARY

This application describes improvements to an optical recording apparatus which adapt the apparatus for an optical recording format using multiple (for example, two or more) modulation levels. Such an apparatus comprises (i) a light source, (ii) a first modulator for modulating an intensity of a light beam, (iii) a formatter for supplying a formatted data signal, and (iv) a modulation interface for supplying to the first modulator a binary modulation signal based on the formatted data signal from the formatter.

For example, an improvement includes adding an electro-optic modulator (EOM) between the light source and the first modulator, to regulate a power of the light beam supplied to the first modulator. The modulation interface is adapted to output a power control signal to the EOM, and the EOM regulates the power of the light beam supplied to the first modulator to a power level corresponding to the power control signal. The apparatus is further adapted to supply the formatted data signal directly from the formatter to the first modulator, without going through the modulation interface. Preferably, the power control signal is based on a baseline signal supplied by the formatter to the modulation interface.

The application also describes a method for adapting an apparatus for recording data on optical discs to enable the apparatus to record in formats using multiple modulation levels. The method, according to an exemplary embodiment, comprises (a) installing an electro-optic modulator in an optical path between a light source and a first modulator of the apparatus, (b) adapting a formatter of the apparatus to supply a baseline power signal, (c) adapting a modulation interface of the apparatus to supply a power control signal, based on the baseline power signal, for controlling the electro-optic modulator to regulate a power of a light beam supplied to the first modulator, (d) connecting the formatter directly to the first modulator, and (e) supplying a formatted data signal directly to the first modulator, without going through the modulation interface. The first modulator modulates an intensity of the light beam amongst multiple modulation levels based on the formatted data signal, to supply a modulated beam.

The application also provides an optical recording apparatus for an optical recording format using multiple modulation levels. In one embodiment, the apparatus includes a light source, a first modulator, an electro-optic modulator, a formatter and a modulation interface. The first modulator modulates an intensity of a light beam supplied thereto, to supply a modulated beam. The electro-optic modulator is between the light source and the first modulator, to regulate a power of the light beam supplied to the first modulator, to a power level corresponding to a power control signal. The formatter supplies a baseline power signal and a formatted data signal. The modulation interface receives the baseline power signal from the formatter and based on the baseline power signal the modulation interface generates the power control signal which is supplied to the electro-optic modulator. The formatted data signal is supplied directly from the formatter to the first modulator, without going through the modulation interface. The first modulator modulates the intensity of the light beam amongst multiple modulation levels based on the formatted data signal.

In addition, this disclosure also provides an optical recording method for an optical recording format using multiple modulation levels. In one embodiment, the method includes (i) generating a power control signal based on a baseline power signal, (ii) supplying the power control signal to an electro-optic modulator in an optical path between a light source and a second modulator, (iii) regulating, with the electro-optic modulator and based on the power control signal, a power of a light beam supplied to the second modulator, (iv) supplying a formatted data signal directly to the second modulator, without going through a modulation interface, and (v) modulating the intensity of the light beam amongst three or more intensity levels, with the second modulator and based on the formatted data signal, to supply a modulated beam.

BRIEF DESCRIPTION OF THE DRAWINGS

The features of the present application can be more readily understood from the following detailed description with reference to the accompanying drawings wherein.

Similar reference numerals designate identical or corresponding parts throughout the several drawings.

DETAILED DESCRIPTION

This application provides an improved optical recording apparatus and an improved optical recording method for optical recording formats which use a faster disc rotation speed and/or allow a shorter minimum pit or mark length (for example, HD-DVD and BD). The apparatus may be integrated in an optical recording device for recording data on recordable or rewritable optical discs in such a format using multiple (for example two or more) modulation levels. Alternatively, the apparatus may be integrated in a laser beam recorder used for cutting a glass master by adapting a formatted signal for such a format using multiple modulation levels and the glass master is then used for making stampers for manufacturing prerecorded optical discs.

Figure 1:
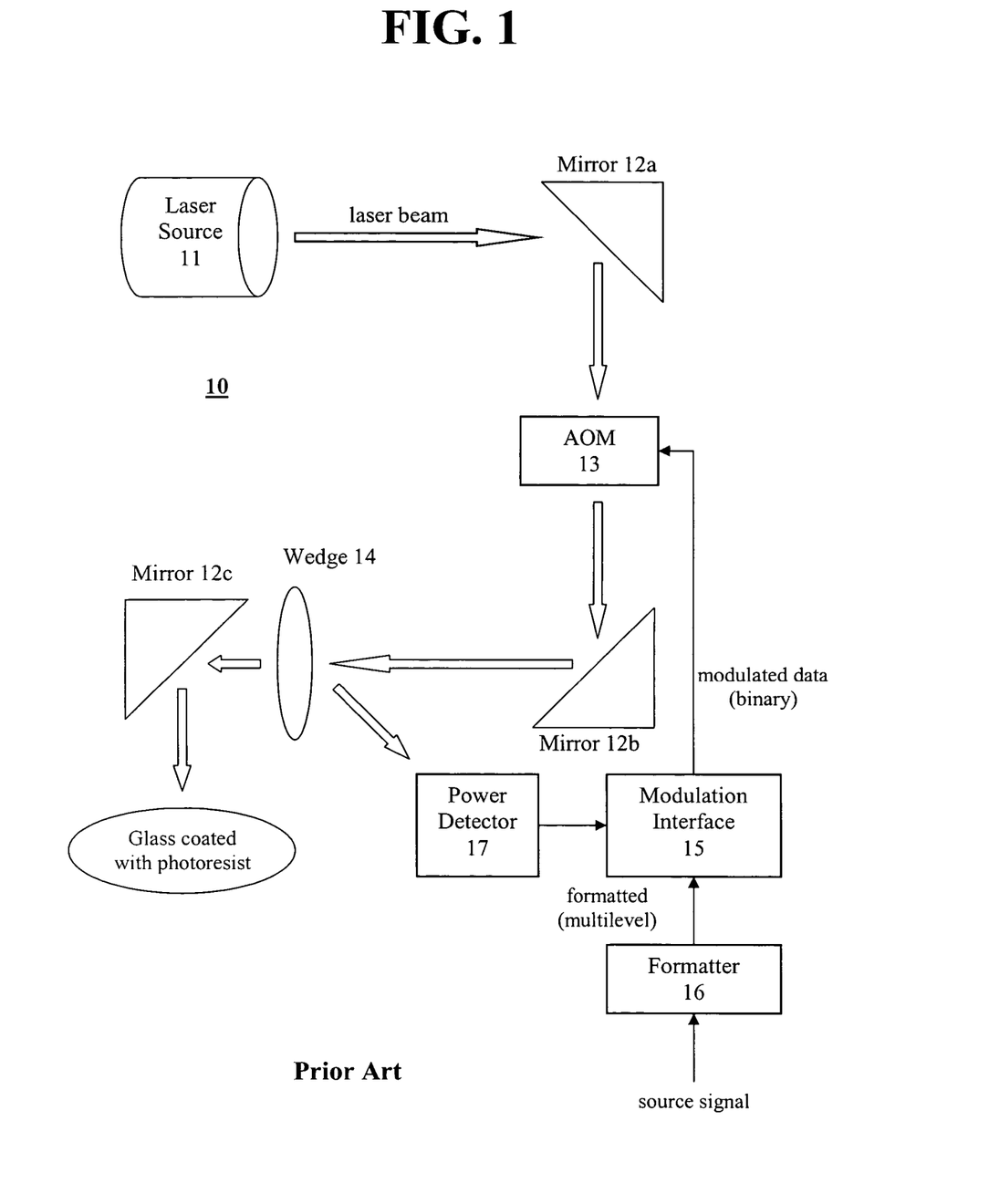
FIG. 1 shows a schematic diagram of a conventional apparatus for recording data on optical discs.

A conventional optical recording apparatus which is configured for an optical, recording format (for example, CD or DVD) using a constant modulation level is shown schematically in FIG. 1. Apparatus 10 includes a light source 11, an AOM (acoustic-optical modulator) 13, modulation interface 15, formatter 16 and power detector 17. In addition, the apparatus 10 includes assorted optical components such as mirrors 12a-12c, wedge 14, etc.

The formatter 16 converts a source signal into a multi-level, formatted data signal (such as formatted for CD, DVD, etc.). The modulation interface 15 converts the multi-level, formatted data signal from the formatter 16 into a binary, pulse-width formatted data signal, by reference to a reference voltage. The binary, formatted data signal is supplied to the AOM 13. The signal supplied to the AOM 13 also embodies power control to a corresponding power level.

The light source 11 generates a light beam which is redirected via the mirror 12a to the AOM 13. The AOM 13 modulates an intensity of the light beam according to the binary, formatted data signal from the modulation interface 15. The AOM 13 also stabilizes the beam, since the laser beam from the light source 11 embodies power fluctuations sporadically. The modulated beam output by the AOM 13 switches between only two intensity levels, corresponding to an on-level and an off-level.

The modulated beam is redirected via the mirror 12b to the wedge 14. The wedge 14 splits the beam into a reflected portion and a transmitted portion. The reflected portion is detected by the power detector 17. The power detector 17 detects a power of the beam and supplies to the modulation interface 15 a power detection signal corresponding to the detected power. The modulation interface 15 compares the power detection signal and an expected intensity and adjusts the power control signal based on a result of the comparison.

The transmitted portion which passes through the wedge 14 is redirected by the mirror 12c (i) onto a rotating glass substrate coated with photoresist (or dye polymer), to form a pattern on the photoresist (or dye polymer) for forming a glass master, or (ii) onto a recordable or rewritable optical disc, to form pits or marks in the recording layer.

The apparatus 10 uses a digital signal to drive the AOM at a constant level modulation (that is, on-level or off-level). Such an apparatus is designed for CD and/or DVD formats, and is unable to provide a modulation scheme with a variable level of pit amplitudes. All pit amplitudes occupy the same level. The apparatus 10 is not suitable for optical recording formats that use multiple modulation levels in the same modulation stream.

As discussed above, mark lengths in conventional optical recording formats, such as DVD, must be in a range between 3 T and 14 T, which can be obtained by a laser beam modulated at a constant modulation level. However, such an apparatus is not suitable for variable-level modulation (that is, different modulation levels in the same modulation stream) which may be used for the new generation of optical recording formats (for example, HD DVD and BD), wherein a mark length corresponding to 2 T (that is, 0.204μ) can be used, and wherein the rotation rate can be substantially higher than conventional formats (for example, 6.61 m/s versus 3.89 m/s).

Conventional techniques cannot develop small pits (for example, corresponding to 2 T). The combination of the needs for small pits and fast data transfer rate can be met by use of variable level modulation. In the mastering stage, the modulation stream accommodates the small pits by increasing the modulation level for small pits and using the standard modulation level for larger pits. The modulation can have multiple modulation levels depending on the recipe adopted for the process used (and conditions of components used in the process).

The improvements disclosed by this patent specification involve changing the apparatus 10, in order to enable recording data in optical recording formats using multiple modulation levels, as further discussed below.

Figure 2:
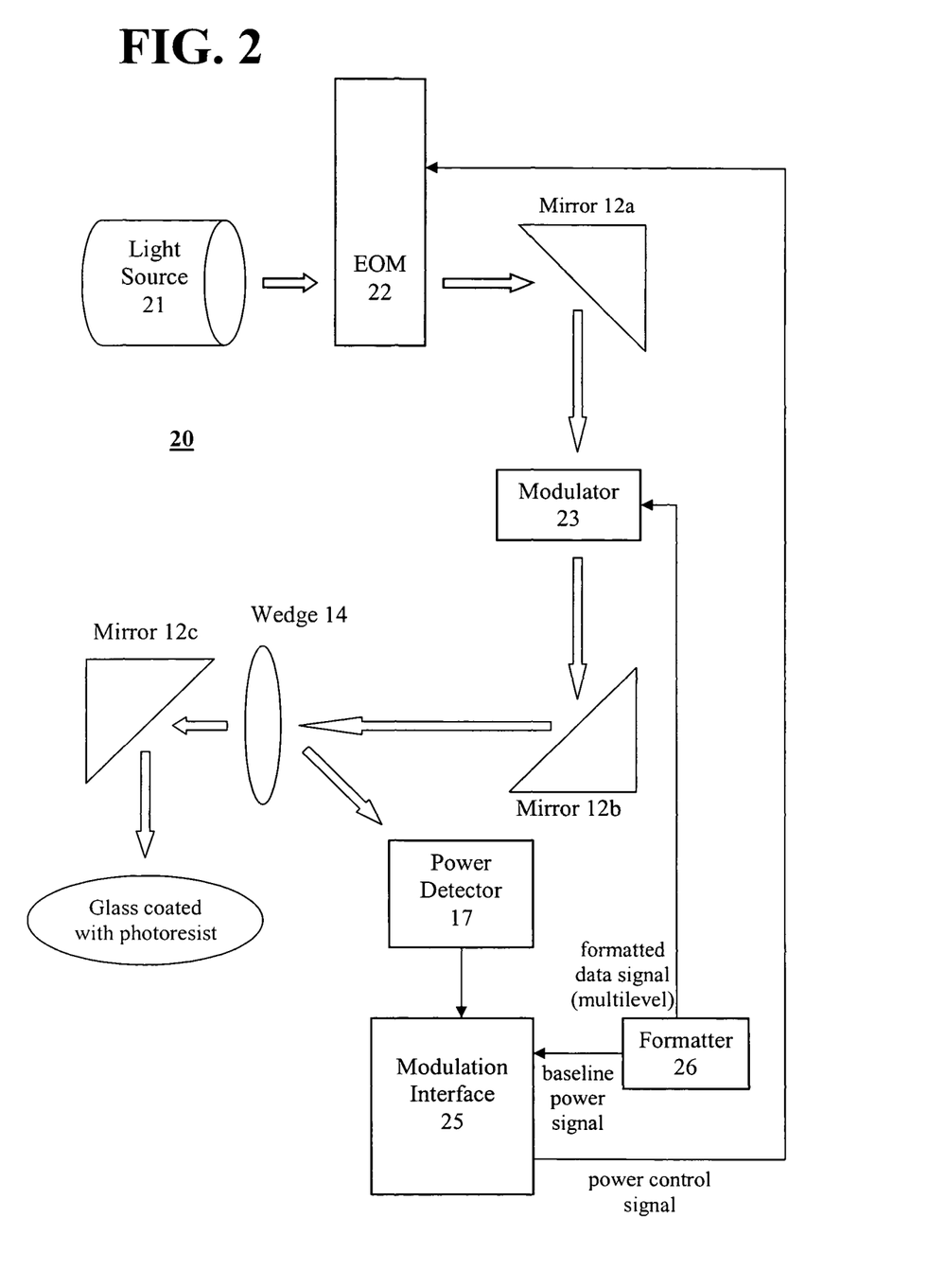
FIG. 2 shows a schematic diagram of an improved apparatus for recording data on optical discs, according to an exemplary embodiment of the present application.

An exemplary embodiment of such an improved apparatus is shown in FIG. 2. Apparatus 20 includes a light source 21, a modulator 23 for modulating an intensity of a light beam, a formatter 26 for supplying a formatted data signal, and a modulation interface 25 for supplying to the modulator 23 a binary modulation signal based on the formatted data signal from the formatter 26. In addition, the apparatus 20 includes an electro-optic modulator (EOM) 22 added between the light source 21 and the modulator 23, to regulate a power of the light beam supplied to the modulator 23. The modulator 23 is shielded by the EOM 22 from power fluctuations in the light beam. The EOM 22 can optionally include an integrated or separate EOM control unit which serves as an interface to the modulation interface 25. The EOM 22 can be any of various commercially-available electro-optic modulators (for example, ConOptics LASS-II).

There are other differences between the apparatus 20 and the apparatus 10.

For example, a different light source may be used for the optical recording format using multiple modulation levels. Although any suitable light source may be used as the light source 21, a TV laser source which radiates laser light of a wavelength of 351 nm is preferred if the format is HD-DVD. HD-DVD and Blu-ray are two proposed formats which are competing to be the standard for the next generation optical recording disc. Each of HD-DVD and Blu-ray provides a pre-recorded format and a recordable format. Each format is designed for use with blue laser technology, in order to achieve higher data density, such as would be required for recording high definition video.

As another example, the formatter 26 is adapted to supply a baseline power signal to the modulation interface 25. The baseline power signal is a constant-level signal. In addition, the apparatus is adapted to supply the formatted data signal from the formatter 26 directly to the modulator 23, without going through the modulation interface 25. A modulation stream of the formatted data signal from the formatter includes multiple modulation levels (for example, a level corresponding to 2 T, a level corresponding to 3 T, standard level and off level).

The modulation interface 25 differs from the modulation interface 15 of FIG. 1 in that the modulation interface 25 is adapted to supply a power control signal to the electro-optic modulator 22. The power control signal from the modulation interface is a constant-level signal. The power detector 17 detects a power of the modulated beam supplied by the modulator 23 and supplies to the modulation interface 25 a power detection signal related to the detected power. The modulation interface 25 compares the power detection signal and an expected intensity and adjusts the power control signal based on a result of the comparison. The EOM 22 regulates the power of the light beam supplied to the first modulator, to a power level corresponding to the power control signal. Thus, the light beam supplied to the first modulator is a constant-level beam.

Since power control is performed by the EOM 22 and the formatted data signal is supplied directly from the formatter 26 to the modulator 23, the modulator 23 can modulate the intensity of the light beam amongst multiple modulation levels based on the formatted data signal. The modulated beam intensities includes a first beam intensity corresponding to a first pit amplitude, a second beam intensity corresponding to a second pit amplitude different from the first beam intensity, and a third beam intensity whereby a pit is not formed on the optical disc. Thus, the improved apparatus can perform variable-level modulation with intensity control, and thus is adapted for optical recording in a format using multiple modulation levels.

The improved apparatus can be integrated in a laser beam recorder for cutting a glass master based on a formatted signal, and the glass master is then used for manufacturing prerecorded optical discs in a format using multiple modulation levels.

Figure 3:
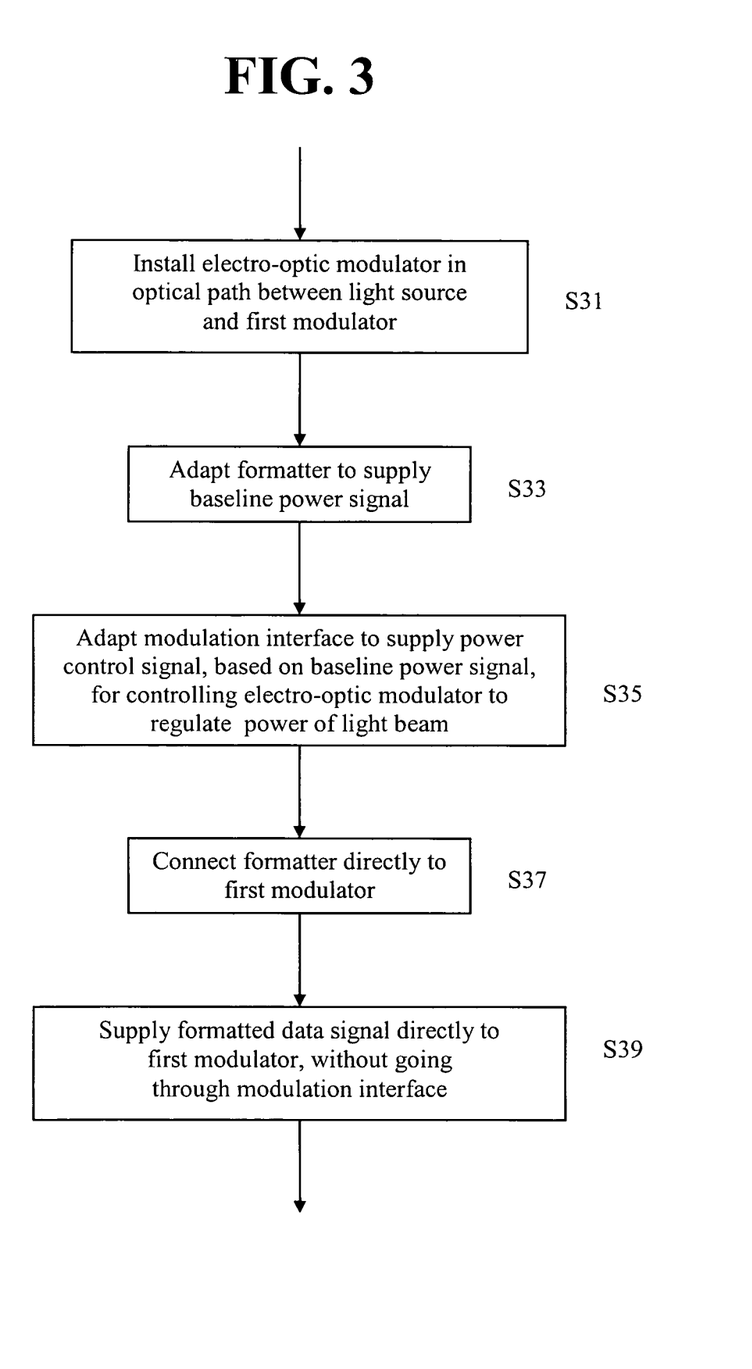
FIG. 3 shows a flow chart of a method for adapting, according to an exemplary embodiment, an apparatus for recording data on optical discs to enable the apparatus to record in formats using multiple modulation levels.

A method for adapting an apparatus for recording data on optical discs to enable the apparatus 10 to record in formats using multiple modulation levels, according to an exemplary embodiment, will now be described with reference to FIGS. 1-3. The electro-optic modulator 22 is installed in an optical path between the light source 21 and the modulator 13 (step S31). The formatter 26 is adapted to supply a baseline power signal (step S33). The modulation interface 25 is adapted to supply a power control signal, based on the baseline power signal, for controlling the EOM 22 to regulate a power of a light beam supplied to the modulator 13 (step S35). The adapted formatter 26 is connected directly to the modulator 13 (step S37). A formatted data signal is supplied by the adapted formatter 26 directly to the modulator 13, without going through the modulation interface 25 (step S39). The modulator 13 modulates an intensity of the light beam amongst multiple modulation levels based on the formatted data signal, to supply a modulated beam.

The adapted apparatus can be used, for example, in an optical recording device for recording a formatted signal onto an optical disc in a format using multiple modulation levels. Alternatively, the adapted apparatus can be integrated in a laser beam recorder for cutting a glass master, and the glass master is then used for manufacturing prerecorded optical discs in a format using multiple modulation levels.

Figure 4:
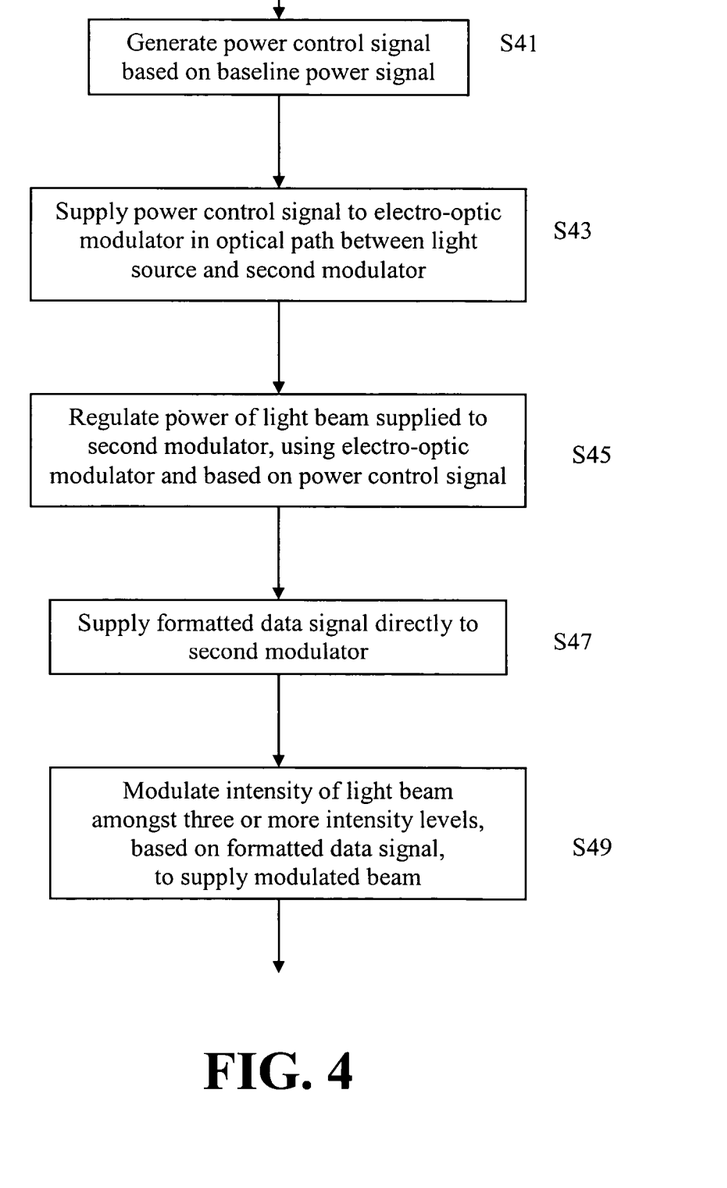
FIG. 4 shows a flow chart of an optical recording method for an optical recording format using multiple modulation levels, according to an exemplary embodiment.

An optical recording method for an optical recording format using multiple modulation levels, according to an exemplary embodiment, will now be described with reference to FIGS. 2 and 4. The modulation interface 25 generates a power control signal based on a baseline power signal from the formatter 26 (step S41). The power control signal from the modulation interface 25 is supplied to the electro-optic modulator 22 in an optical path between the light source 21 and the modulator 23 (step S43). The EOM 22 regulates a power of a light beam supplied to the modulator 23, to a power level corresponding to the power control signal (step S45). A formatted data signal from the formatter 26 is supplied directly to the modulator 23, without going through the modulation interface 25 (step S47). The modulator 23 modulates the intensity of the light beam amongst multiple modulation levels, based on the formatted data signal, to supply a modulated beam (step S49). The method can further include detecting a power of the modulated beam, supplying a power detection signal related to the detected power, comparing the power detection signal and an expected intensity, and adjusting the power control signal based on a result of the comparison.

In describing exemplary embodiments, specific terminology is employed for the sake of clarity in this disclosure. However, the disclosure of this patent specification is not intended to be limited to the specific terminology so selected and it is to be understood that each specific element includes all technical equivalents that operate in a similar manner.

In addition, the above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims. As another example, the steps in the methods described herein need not be performed in exactly the order described (for example, methods of FIG. 3 and FIG. 4).

What is claimed is:

1. An improvement to an optical recording apparatus comprising (i) a light source, (ii) a first modulator for modulating an intensity of a light beam, (iii) a formatter, and (iv) a modulation interface, said improvement including:
an electro-optic modulator added in an optical path between the light source and the first modulator, to regulate a power of the light beam supplied to the first modulator,
wherein the formatter is adapted to supply a baseline power signal to the modulation interface and supply a formatted data signal of three or more modulation levels to the first modulator;
wherein the modulation interface is adapted to supply a power control signal to the electro-optic modulator, and the electro-optic modulator regulates the power of the light beam supplied to the first modulator to a power level corresponding to the power control level,
wherein the modulation levels include a first beam intensity corresponding to a first pit length, a second beam intensity corresponding to a second pit length, and a third beam intensity whereby a pit is not formed,
wherein at least one of the first pit length and the second pit length corresponds to less than 3T, and
wherein the apparatus is adapted by supplying the formatted data signal directly from the formatter to the first modulator, without going through the modulation interface.

2. The improved apparatus of claim 1, wherein the apparatus is adapted for optical recording in a format using multiple modulation levels.

3. The improved apparatus of claim 1, wherein the apparatus is adapted for cutting a glass master based on a formatted signal, and the glass master is then used for manufacturing prerecorded optical discs in a format using multiple modulation levels.

4. The improved apparatus of claim 1, wherein the first modulator modulates the intensity of the light beam amongst multiple modulation levels based on the formatted data signal.

5. The improved apparatus of claim 1, wherein the formatter is adapted to supply a constant-level baseline power signal to the modulation interface.

6. The optical recording apparatus of claim 1 wherein the at least one of the first pit length and the second pit length corresponds to 2T.

7. The optical recording apparatus of claim 1 wherein the at least one of the first pit length and the second pit length is configured at a rotation rate of an optical disc of at least 6.61 m/s.

8. The optical recording apparatus of claim 1, wherein the first pit length corresponds to less than 3T and the second pit length corresponds to greater than or equal to 3T and wherein the first beam intensity is greater than the second beam intensity.

9. An optical recording apparatus for an optical recording format using multiple modulation levels, said apparatus comprising:
a light source;
a first modulator for modulating an intensity of a light beam supplied thereto, to supply a modulated beam;
an electro-optic modulator in an optical path between said light source and said first modulator, to regulate a power of the light beam supplied to the first modulator, to a power level corresponding to a power control signal;
a formatter configured to supply a baseline power signal and a formatted data signal of three or more modulation levels; and
a modulation interface configured to receive the baseline power signal from said formatter and supply the power control signal to the electro-optic modulator,
wherein the formatted data signal is supplied directly from said formatter to said first modulator, without going through said modulation interface,
wherein the modulation levels include a first beam intensity corresponding to a first pit length, a second beam intensity corresponding to a second pit length, and a third beam intensity whereby a pit is not formed,
wherein at least one of the first pit length and the second pit length corresponds to less than 3T, and
wherein said first modulator modulates the intensity of the light beam amongst multiple modulation levels based on the formatted data signal.

10. The apparatus of claim 9 further comprising a power detector, wherein said power detector detects a power of the modulated beam supplied by said first modulator and supplies to said modulation interface a power detection signal related to the detected power, and said modulation interface compares the power detection signal and an expected intensity and adjusts the power control signal based on a result of the comparison.

11. The apparatus of claim 9, wherein the baseline power signal from said formatter is a constant-level signal.

12. A laser beam recorder comprising the apparatus of claim 9, wherein said laser beam recorder is used for cutting a glass master based on a formatted signal, and the glass master is then used for manufacturing prerecorded optical discs in the format using multiple modulation levels.

13. A method for adapting an optical recording apparatus for optical recording formats using multiple modulation levels, said method comprising:
   installing an electro-optic modulator in an optical path between a light source and a first modulator of said apparatus;
   adapting a formatter of said apparatus to supply a baseline power signal and a formatted data signal of three or more modulation levels;
   adapting a modulation interface of said apparatus to supply a power control signal, based on the baseline power signal, for controlling the electro-optic modulator to regulate a power of a light beam supplied to the first modulator;
   connecting the formatter of said apparatus directly to the first modulator; and
   supplying said formatted data signal directly to the first modulator, without going through the modulation interface,
   wherein the first modulator modulates an intensity of the light beam amongst multiple modulation levels based on the formatted data signal, to supply a modulated beam,
   wherein the modulation levels include a first beam intensity corresponding to a first pit length, a second beam intensity corresponding to a second pit length, and a third beam intensity whereby a pit is not formed, and
   wherein at least one of the first pit length and the second pit length corresponds to less than 3T.

14. The method of claim 13, wherein the adapted apparatus is used for cutting a glass master, and the glass master is then used for manufacturing prerecorded optical discs in a format using multiple modulation levels.

15. The method of claim 13, wherein the baseline power signal from said formatter is a constant-level signal.

16. An optical recording method for formats using multiple modulation levels, said method comprising:
   generating with a modulation interface a power control signal based on a baseline power signal from a formatter;
   supplying the power control signal from the modulation interface to an electro-optic modulator installed in an optical path between a light source and a second modulator;
   regulating, with the electro-optic modulator and based on the power control signal supplied from the modulation interface, a power of a light beam supplied to the second modulator;
   supplying a formatted data signal of three or more modulation levels directly from said formatter to the second modulator, without going through the modulation interface; and
   modulating the intensity of the light beam amongst multiple modulation levels, with the second modulator, based on the formatted data signal supplied directly from the formatter, to supply a modulated beam,
   wherein the modulation levels include a first beam intensity corresponding to a first pit length, a second beam intensity corresponding to a second pit length, and a third beam intensity whereby a pit is not formed and
   wherein at least one of the first pit length and the second pit length corresponds to less than 3T.

17. The method of claim 16 further comprising using the modulated beam for cutting a glass master, and using the glass master for manufacturing prerecorded optical discs in the format using multiple modulation levels.

18. The method of claim 16, wherein the baseline power signal from said formatter is a constant-level signal.

19. The method of claim 16 further comprising:
   detecting a power of the modulated beam;
   supplying a power detection signal related to the detected power;
   comparing the power detection signal and an expected intensity; and
   adjusting the power control signal based on a result of the comparison.

* * * * *